United States Patent [19]

Nishikawa

[11] Patent Number: 4,771,225

[45] Date of Patent: Sep. 13, 1988

[54] DEVICE FOR LIMITING SWITCHING FREQUENCY OF A PARALLEL CAPACITOR REACTIVE POWER COMPENSATION NETWORK

[75] Inventor: Tadashi Nishikawa, Akishima, Japan

[73] Assignee: Kabushiki Kaisha Toshiba, Kawasaki, Japan

[21] Appl. No.: 22,789

[22] Filed: Mar. 6, 1987

[30] Foreign Application Priority Data

Mar. 26, 1986 [JP] Japan ................................. 61-65920

[51] Int. Cl.$^4$ ............................................. G05F 5/00
[52] U.S. Cl. ................................................... 323/211
[58] Field of Search ........................ 323/209, 210, 211

[56] References Cited

U.S. PATENT DOCUMENTS

| | | | |
|---|---|---|---|
| 3,300,712 | 1/1967 | Segsworth | 323/209 |
| 3,391,329 | 7/1968 | Meyer | 323/209 X |
| 3,754,184 | 8/1973 | Stone | 323/210 |
| 4,204,150 | 5/1980 | Mathieu | 323/211 |
| 4,621,198 | 11/1986 | Roberge et al. | 323/211 X |
| 4,645,997 | 2/1987 | Whited | 323/211 |

OTHER PUBLICATIONS

ASEA Reg. 48976, 7143, pp. 3–7; "Power-Factor Correction with Thyristor-Controlled Capacitors"; H. Frank et al.

Primary Examiner—Patrick R. Salce
Assistant Examiner—Marc S. Hoff
Attorney, Agent, or Firm—Foley & Lardner, Schwartz, Jeffery, Schwaab, Mack, Blumenthal & Evans

[57] ABSTRACT

A reactive power compensation device has minimum residual reactive power and avoid hunting. The compensation device is connected to an AC power supply network with a variable reactive load. Capacitor banks are connected in parallel with the load, and a pertinent number of banks are switched on and off periodically at a pre-determined time interval. The reactive power in both the load and the capacitor banks are detected and used for controlling the capacitor banks.

4 Claims, 5 Drawing Sheets

4,771,225

DEVICE FOR LIMITING SWITCHING FREQUENCY OF A PARALLEL CAPACITOR REACTIVE POWER COMPENSATION NETWORK

BACKGROUND OF THE INVENTION

1. Field of the Invention

This invention generally relates to reactive power compensators, and more particularly to reactive power compensators with capacitors.

2. Description of the Prior Art

It is well known that the reactive power caused by a reactive load connected to an AC power supply network can be compensated with capacitors. ASEA Reg. 48976,7143 discloses reactive power compensators having capacitors connected in parallel with the load and in series with a pair of anti-parallel thyristors for each capacitor. The thyristors are switched on and off in accordance with changes of the reactive power of the load.

In the above-cited paper, however, the reactive power is estimated based only on the current in the reactive load, and the current in the compensator itself is not measured or included in such an estimate. Therefore, these reactive power compensators use an open-loop control system, and there will remain some deviation between the ultimate state and the target state, where the reactive power at the feeder for the load and the coupled compensators is minimized.

If the reactive power value used in the compensator control system is estimated based on the current at the feeder for the load and the coupled compensators, the control system would form a closed loop, which would result in more precise control than an open-loop control. However, when the reactive load changes rapidly and the compensation control system responds rapidly, such a closed loop control can cause an oscillatory reaction called "hunting" with a characteristic frequency determined by the power supply system and the control system.

SUMMARY OF THE INVENTION

The object of this invention is to compensate reactive power both in a variable reactive load and in its associated compensators, with minimum residual reactive power and without the occurrence of hunting.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

This invention provides a reactive power compensation device for connection to an AC power supply network with a variable reactive load, comprising: a plurality of capacitor banks connected in parallel with the load, each capcitor bank comprising a capacitor; means for detecting the combined reactive power in the load and the capacitor banks; means for generating a signal representing a required number of the capacitor banks corresponding to the detected reactor power; and means for switching on and switching off the capacitive banks corresponding to the signal at predetermined time intervals for compensating the combined reactive power.

BRIEF DESCRIPTION OF THE DRAWINGS

The accompanying drawings, which are incorporated in and constitute a part of this specification, illustrate one embodiment of the invention and together with the description, serve to explain the principles of the invention.

DETAILED DESCRIPTION OF THE PREFERRED EMBODIMENT

Figure 1:
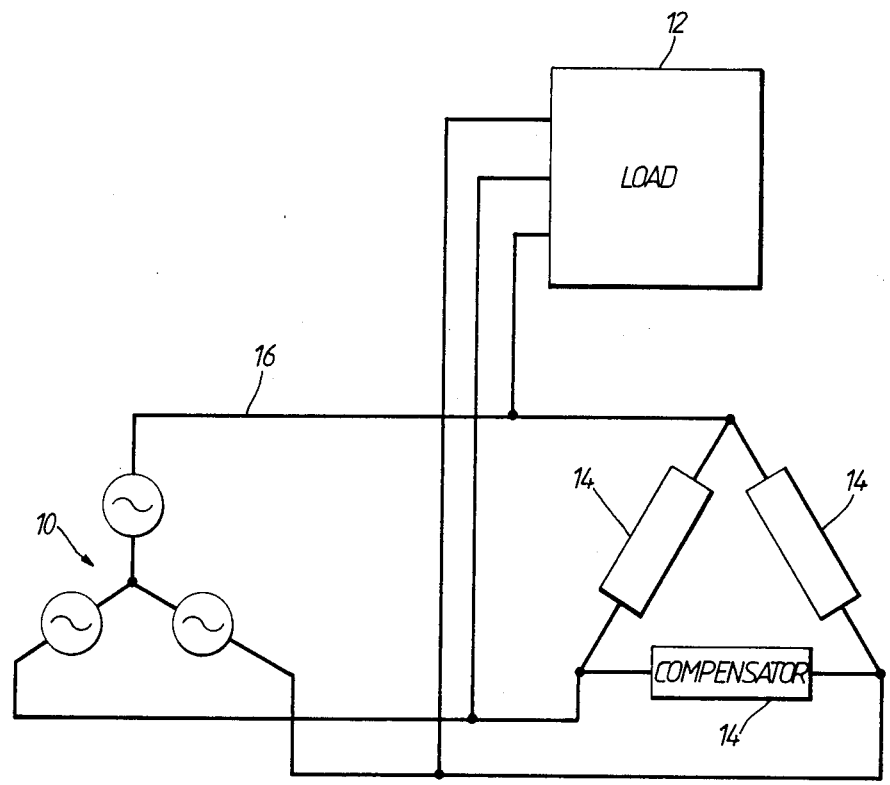
FIG. 1 is a conceptional diagram of a three-phase electric power network with a load and a plurality of delta-connected reactive power compensators.

Referring to FIG. 1, a three-phase electric power supply network comprises a star-connected power source 10, a variable reactive load 12 and delta-connected reactive power compensators 14. Numeral 16 denotes a power feeder. The power source may be connected in "delta", and the compensators may be connected in "star" for variations to the embodiment shown in FIG. 1.

Figure 2:
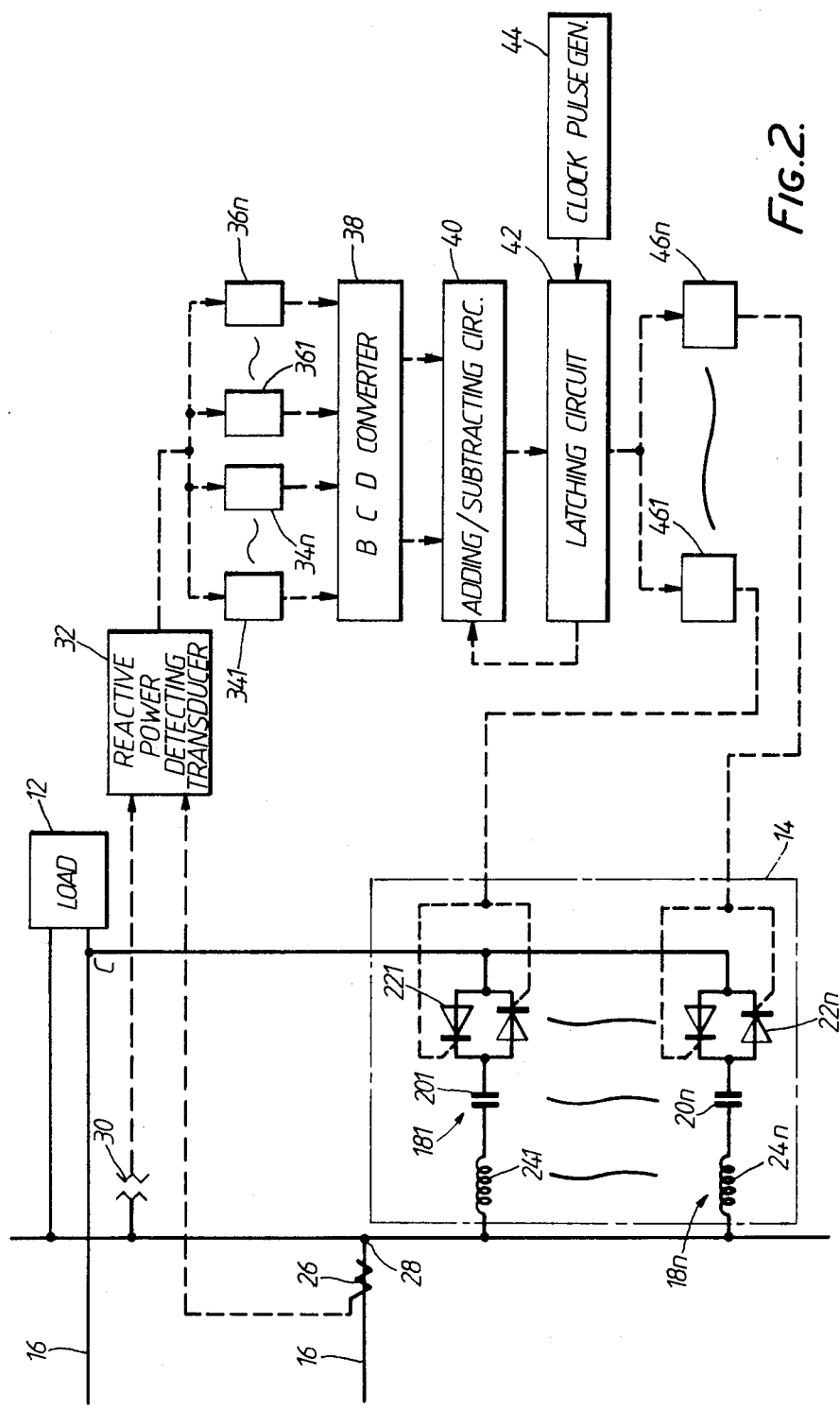
FIG. 2 is a block diagram of a reactive power compensator of an embodiment of this invention in one of the three phases of the power supply network shown in FIG. 1.

A detailed structure of a compensator with its controller for a single phase power supply is shown in FIG. 2. In this figure, solid lines denote large current power cables, while dashed lines denote signal cables. The compensator 14 comprises n capacitor banks 181 through 18n connected in parallel, each of which has a capacitor 201 through 20n, a pair of anti-parallel thyristors 221 through 22n and a reactor 241 through 24n connected in series, wherein "n" is larger than unity and denotes the number of the capacitor banks. The reactors 241 through 24n are connected in order to eliminate the risk of resonance at the harmonics present in the power supply network.

A current transformer 26 is arranged on a feeder 16 upstream of the joint 28 of the compensator 14 and the load 12, so that the current to both the load 12 and the compensator 14 can be detected. A potential transformer 30 for voltage detection is arranged in parallel to the load 12. A reactive power detecting transducer 32 is connected to the current transducer 26 and the potential transformer 30, so that the reactive power in the load 12 and the compensator 14 can be detected.

The output of the transducer 32 is supplied to a plurality of positive level detecting circuits 341 through 34n and the same number of negative level detecting circuits 361 through 36n.

The outputs of the level detecting circuits 341 through 34n and 361 through 36n are fed to a BCD (binary-coded decimal) converter 38.

The output of the converter 38 is fed to an adding/subtracting circuit 40. The output of the adding/subtracting circuit 40 is fed to a latching circuit 42 which latches the input signal for a period predetermined by a clock pulse generator 44.

The output of the latohing circuit 42 is fed back to the adding/subtracting circuit 40, and is also fed to gate controlling units 461 through 46n each of which switches on and off a corresponding pair of the thyristors 221 through 22n.

Figure 3:
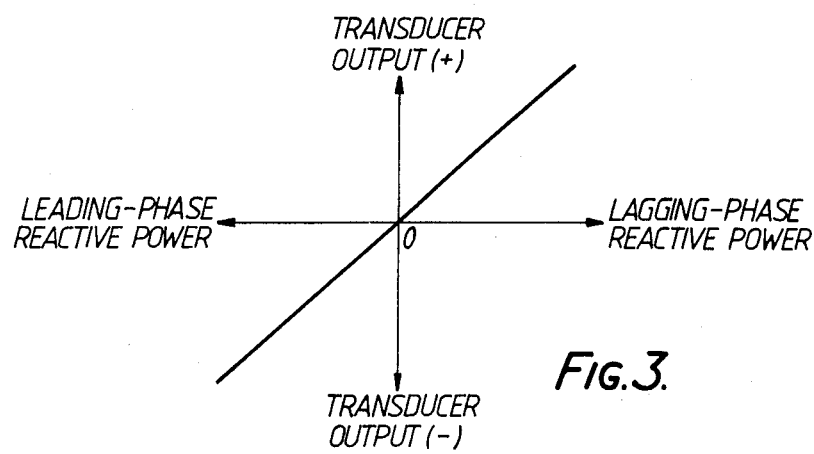
FIG. 3 is a graph showing relationship between the input and the output of the reactive power detecting transducer shown in FIG. 2.

Referring to FIG. 3, the reactive power detecting transducer 32 has linear characteristics, and a lagging-phase reactive power gives a positive output, while a leading phase reactive power gives a negative output.

Figure 4A:
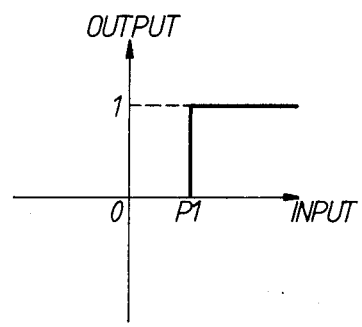
FIGS. 4(a), 4(b), 4(c) and 4(d) are graphs showing relationships between the inputs and the outputs of the first and n-th positive level detecting circuits, and the first and n-th negative level detecting circuits shown in FIG. 2, respectively.
Figure 4B:
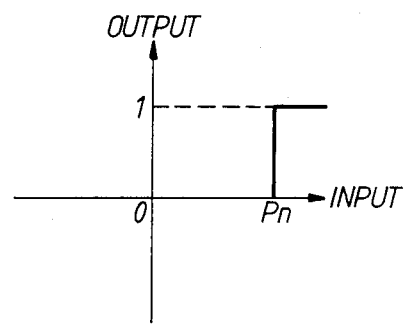

Referring to FIG. 4(a), the output of the first positive level detecting circuit 341 becomes 1 only when the input to the first level detecting circuit 341 is larger than a positive value P1, corresponding to a lagging-phase reactive power requiring one additional capacitor bang. Likewise, referring to FIG. 4(b), the output of the n-th positive level detecting circuit 34n becomes 1 only when the input to the n-th level detecting circuit 34n is larger than a positive value Pn, corresponding to a reactive power requiring n additional capacitor banks. The other positive level detecting circuits 342, 343, etc. have similar characteristics, except for the input values for the stepwise change.

Figure 4C:
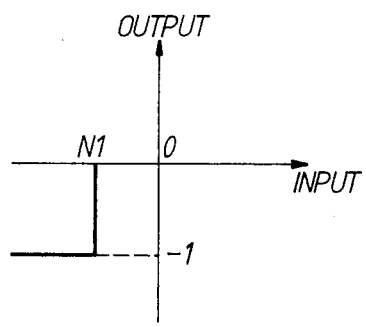
Figure 4D:
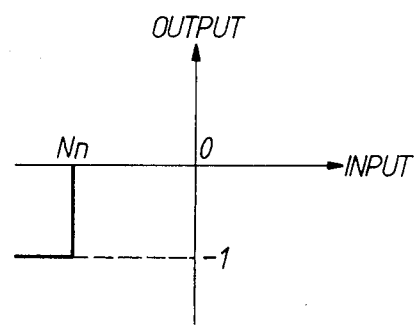

Likewise, referring to FIG. 4(c), the output of the first negative level detecting circuit 361 becomes −1 only when the input to the first negative level detecting circuit 361 is smaller than a negative value N1 corresponding to reactive power of one excessive capacitor bank. Referring to FIG. 4(d), the output of the n-th negative level detecting circuit 36n becomes −1 only when the input to the n-th negative level detecting circuit 36n is smaller than a negative value Nn, corresponding to reactive power of n excessive capacitor banks. The other negative level detecting circuits 362, 363, etc. have similar characteristics, except for the input values for the stepwise change.

Figure 5:
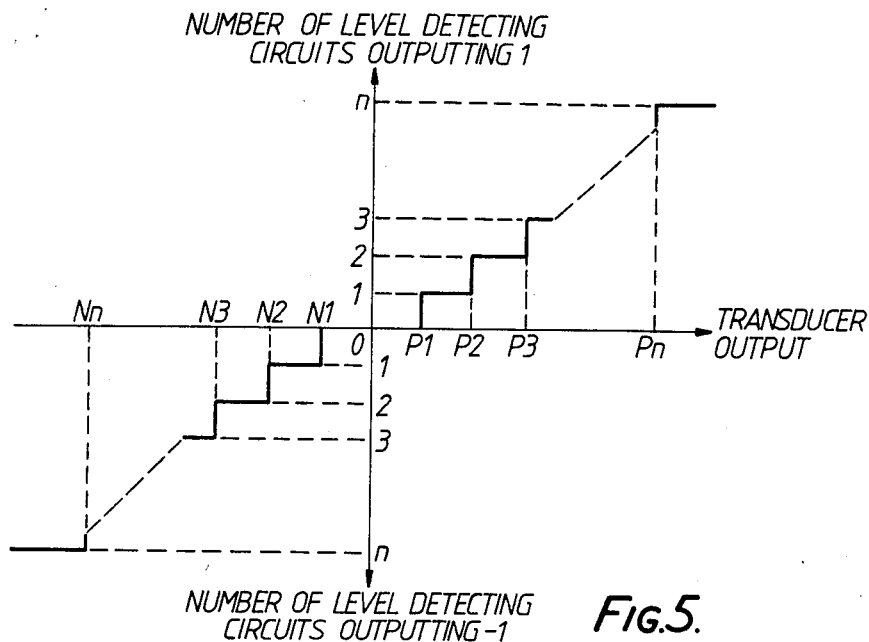
FIG. 5 is a graph showing the number of level detecting circuits shown in FIG. 2 which output 1 or −1 in accordance with the output of the reactive power detecting transducer.

As the output of the transducer 32 is fed to all of the level detecting circuits 341 through 34n and 361 through 36n, the number of the positive level detecting circuits 341 through 34n outputting 1 and the number of the negative level detecting curcuits 361 through 36n outputting −1 change corresponding to the detected reactive power, as shown in FIG. 5.

Reactive power is detected by the detecting transducer 32, and its output is represented as the number of the level detecting circuits 341 through 34n or 361 through 36n which output 1 or −1. The number corresponds to the required number of capacitor banks to be added or to be detached. The outputs of the level detecting circuits 341 through 34n and 361 through 36n are translated in the BCD converter 38 into a control signal which identifies a pertinent number of capacitor banks to be switched on or off. The output of the converter 38 is fed to the adding/subtracting circuit 40, where the output of the converter 38 is added to or subtracted from the latched value in the latching circuit 42 in accordance with the sign of the output of the converter 38.

The latching circuit 42 latches the result calculated by the adding/subtracting circuit 40 for a period predetermined by the clock pulse generator 44.

The output of the latching circuit 42 is fed to the gate control units 461 through 46n. Each of the gate control units 461 through 46n controls a corresponding one of the pairs of the anti-parallel thyristors 221 through 22n, and only the required number of capacitor banks are switched on.

Figure 6A:
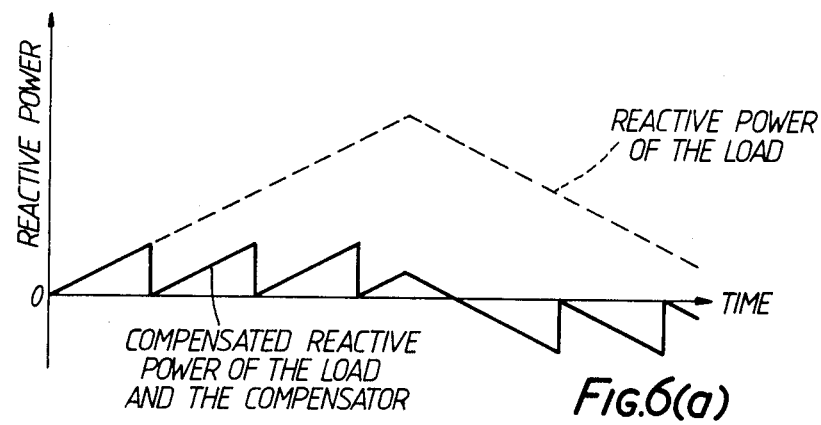
FIG. 6(a) is a graph showing slowly changing reactive power of the load and corresponding reactive power compensated with a compensator shown in FIG. 2.
Figure 6B:
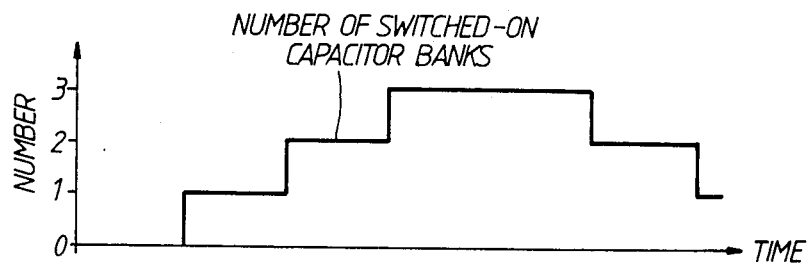
FIG. 6 (b) is a graph of the number of switched-on capcitor banks corresponding to FIG. 6(a)

Referring to FIGS. 6(a) and 6(b), when the reactive power of the load 12 increases from zero to a positive value and then decreases very slowly, as shown by the dotted line in FIG. 6(a), the required number of capacitor banks are switched on and off at appropriate times, as shown in FIG. 6(b), and the combined compensated reactive power of the load 12 and the compensator 14 is held within a narrow band corresponding to a single deficient or excess capacitor bank, as shown by the solid line in FIG. 6(a).

Since the detected reactive power used for the control is based on the current both in the load 12 and the compensator 14, the residual deflection of the reactive power is mitigated, compared with the open loop control system.

Figure 7A:
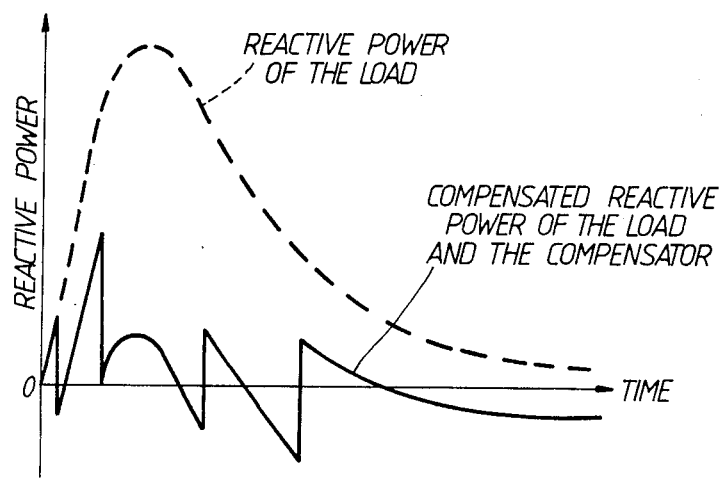
FIGS. 7(a) and 7(b) are graphs of compensated reactive powers obtained, respectively, with a compensator not having a latching circuit, and with a compensator of this invention.

Referring to FIG. 7(a), when the reactive power of the load 12 changes rapidly, as shown by the dashed line, the compeneated reactive power fluctuates more than that in the slowly changing case, as shown by the solid line, because the switching time for capacitor banks 181 through 18n is limited to the latching period stipulated by the clock pulse generator 44. However, no hunting takes place because of the limitation of the switching time.

Figure 7B:
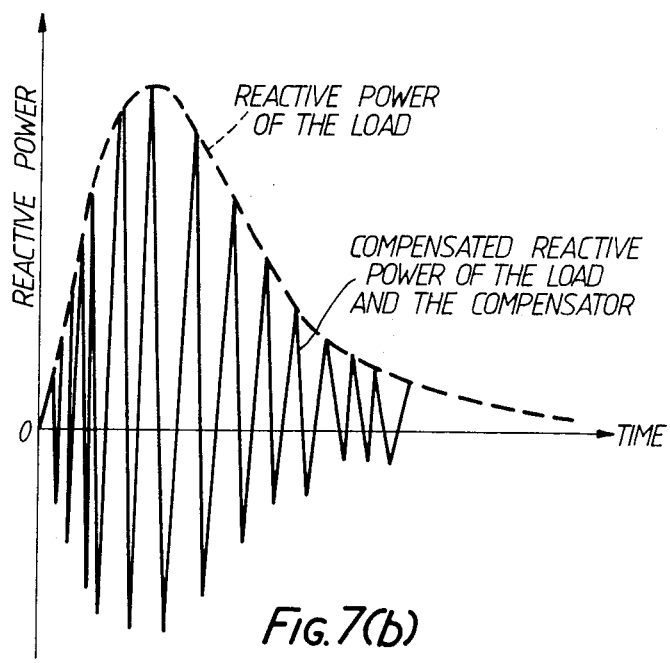

FIG. 7(b) shows a compensated reactive power in response to the same reactive power change of the load 12 as in the case of FIG. 7(a). The compensated reactive power shown by the solid line in FIG. 7(b) is obtained by using a compensator which is the same as the above-mentioned embodiment, except that the latching circuit 42 and the clock pulse generator 44 are omitted. In this case, the compensated reactive power oscillates, causing "hunting", with a characteristic frequency determined by the power supply system and the control system.

The foregoing description has been set forth merely to illustrate a preferred embodiment of the invention and is not intended to be limiting. Accordingly, modifications of the described embodiment and equivalents incorporating the spirit and substance of the invention should be considered within the scope of the appended claims

What is claimed is:

1. A reactive power compensation device for connection to an AC power supply network with a variable reactive load, comprising;
   (1) a plurality of capacitor banks switchably connected in parallel with the load, each capacitor bank comprising a capacitor;
   (2) means for detecting the combined reactive power in the load and the capacitor banks;
   (3) means for generating a signal representing a required number of the capacitor banks corresponding to the detected reactive power; and
   (4) means responsive to said signal, for switching on and switching off the capacitor banks corresponding to connection and disconnection respectively of said capacitor banks to said load; and (5) means for limiting the frequency of said switching means to be less than the characteristic frequency of AC power supply network and said capacitor banks so as to avoid hunting of a combined reactive power of said reactive power compensation device and said load.

2. A device according to claim 1, wherein the means for switching on and switching off the capacitor banks includes a plurality of pairs of anti-parallel thyristors, each pair connected in series with one of the capacitor banks.

3. A device according to claim 1, wherein the means for switching on and switching off the capacitor banks also includes latch means for latching the signal for predetermined time intervals corresponding to said limited frequency.

4. A method of compensating the reactive power of a variable reactive load comprising the steps of:
  (a) providing a plurality of capacitor banks connectable in parallel with said load;
  (b) detecting the combined reactive power of the load and the capacitor banks;
  (c) in response to the detected combined reactive power, generating a signal representing a required number of capacitor banks needed to compensate said detective reactive power; and
  (d) in response to said generated signal, switchably connecting and disconnecting ones of said plurality of capacitor banks in parallel with said load to compensate for said detected reactive power while simultaneously limiting the frequency of said switching to avoid hunting of the combined reactive power of the load and capacitor banks.

* * * * *